United States Patent [19]

Goel et al.

[11] Patent Number: 4,562,240

[45] Date of Patent: Dec. 31, 1985

[54] BICYCLIC AMIDE ACETAL/POLYOL/POLYISOCYANATE POLYMERS

[75] Inventors: Anil B. Goel, Worthington; Timothy A. Tufts, Columbus, both of Ohio

[73] Assignee: Ashland Oil, Inc., Ashland, Ky.

[21] Appl. No.: 684,187

[22] Filed: Dec. 20, 1984

[51] Int. Cl.$^4$ ............................................. C08G 18/38
[52] U.S. Cl. ................................... 528/73; 521/163; 521/158; 548/218
[58] Field of Search ......................... 528/73; 521/158; 548/218

[56] References Cited

U.S. PATENT DOCUMENTS

| | | | |
|---|---|---|---|
| 3,738,992 | 6/1973 | Frump | 548/218 |
| 3,773,730 | 11/1973 | Hunsucker | 548/218 |
| 3,824,164 | 7/1974 | Himies | 548/218 |
| 3,952,000 | 4/1976 | Sidi et al. | 548/218 |
| 4,101,527 | 7/1978 | Cunningham et al. | 528/73 |
| 4,277,353 | 7/1981 | Deen et al. | 548/218 |

FOREIGN PATENT DOCUMENTS 3235933 3/1984 Fed. Rep. of Germany .

*Primary Examiner*—Maurice J. Welsh
*Attorney, Agent, or Firm*—John F. Jones

[57] ABSTRACT

A process is described for preparing novel polyurethane polymers which have good impact resistance and other desirable physical properties, said process comprising interpolymerizing a mixture of a bicyclic amide acetal, a polyol and a polyisocyanate.

14 Claims, No Drawings

BICYCLIC AMIDE ACETAL/POLYOL/POLYISOCYANATE POLYMERS

This invention relates to novel polymers which result from the interaction of bicyclic amide acetals, polyols and polyisocyanates and to a process for preparing them.

The reaction of bicyclic amide acetals with polyisocyanates to produce brittle polymers has been disclosed in West German patent publication No 3,235,933. The preparation of polymers by the interaction of a bicyclic amide acetal, a polyol and a polyisocyanate have not previously been reported.

We have discovered that polymers having improved physical properties including decreased brittleness (high impact strength) compared with previously described bicyclic amide acetal/polyisocyanate polymers can be produced by the inter-polymerization of mixtures of a bicyclic amide acetal, a polyol and a polyisocyanate.

Although bicyclic amide acetals have been shown to react with polyisocyanates at elevated temperatures, these reactions are quite slow at room temperature usually taking one-half hour or more for completion. The polymers resulting from such reaction have been found to be quite brittle which detracts from their usefulness. We have discovered that the inclusion of a polyol in the reaction of a bicyclic amide acetal with a polyisocyanate will increase the reaction rate and produce improved polymeric products. The reaction rate can be conveniently varied by adjustment of the amount and type of polyol used in our process. The increased rates of our process make it suitable for use in reaction injection molding (RIM) processes, for instance. In addition to the faster reaction rates achieved in our process, the polymers produced have been found to possess improved quality and physical properties.

The polyols useful in this invention include those having at least two hydroxyl groups per molecule and having equivalent weights falling in the range of from 20 to 5000. Specific polyols include butane diol, cyclohexane dimethanol, tripropylene glycol, amide diols

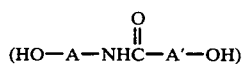

where A and A' are alkyl or aryl groups with 2 to 20 carbon atoms, urethane diols,

(where A and A' have the earlier-described definitions) polyether polyols such as poly(tetra-methylene ether) diols, poly (propylene ether) polyols, polyester polyols, etc.

Polyhydroxy polyethers are suitable and preferably those having at least 2 hydroxyl groups per molecule. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propanes and 4,4'-dihydroxy diphenyl propane. Sucrose poly ethers also may be used. Poly butadienes having hydroxyl groups as well as other known hydroxyl containing vinyl addition polymerized polymers can be used.

According to the present invention, hydroxyl containing polyesters, polythioethers, polyacetals, polycarbonates or polyesteramides of the types known for the formation of polyurethanes may also be used.

Particularly useful polyols for the present invention include the following representative aliphatic and aromatic polyhydric alcohols.

Aliphatic Polyhydric Alcohols ethylene glycol
propylene glycol
trimethylene glycol
triethylene glycol
pentaethylene glycol
polyethylene glycol
1,4-butanediol
diethylene glycol
dipropylene glycol
2,2-dimethyl-1,3-propanediol
hexamethylene glycol
1,4-cyclohexane dimethanol

Aromatic Polyhydric Alcohols xylene alcohols
ethyl resorcinol
propyl resorcinol
2,4-dimethyl resorcinol
3,6-dimethyl-1,2,4-benzene triol
ethyl pyrogallol
2,4-methyl-1,4-dihydroxy naphthalene
3-methyl-1,4,5-naphthalene triol
dimethylol toluene
dimethylol xylene
bis-hydroxy ethyl or bis-hydroxy propyl ethers of resorcinol, catechol, or hydroquinones
1,5-dihydroxy naphthalene
4,4'-isopropylidene-bis-phenol, and the like The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two or more fully disclosed in U.S. Pat. Nos. 3,350,362 and 3,382,215. Polyisocyanates which are polymeric in nature including isocyanate prepolymers of all types are included in this invention.

The bicyclic amide acetals useful in this invention are those having the formula I

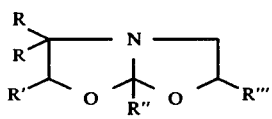

Wherein R, R' and R''' independently represent hydrogen or an alkyl group having from 1 to 18 carbon atoms, and R''' also represents an alkyl ether, aryl or alkaryl ether group of 1–18 carbon atoms. R" represents an alkyl group having from 1 to 18 carbon atoms, an aryl group having 6 to 12 carbon atoms, or an alkaryl group having 7 to 20 carbon atoms.

The weight ratio of bicyclic amide acetal to polyol should range from about 99:1 to 0.1:99.9, respectively. The bicyclic amide acetals are considered to be bifunctional toward the isocyanate group. In this invention, the overall equivalent ratio of —NCO to (—OH and one-half bicyclic amide acetal) can vary from about 0.8:1 to about 3:1.

If desired, well known catalysts used in polyurethane technology such as tertiary amines, metal salts, including tin carboxylates, and the like, can be used in this invention.

The following representative examples will further illustrate this invention.

EXAMPLES 1-6

In a series of experiments, a bicyclic amide acetal, 4,4'-methylene bis(phenyl isocyanate) and polyol were mixed at room temperature and the course of the exothermic reaction was observed by measuring the reaction temperature with time. The time to exotherm maximum was considered to be the gel time. In Examples 1 and 3, no polyol was used and these examples are controls which are outside the scope of the present invention. The amounts of ingredients used and gel times are given in Table 1.

TABLE 1

| Example Number | Bicyclic Amide Acetal (Formula I) (g) | Polyol g | Diisocyanate g | Gel Time Minutes |
|---|---|---|---|---|
| 1 | R,R'R''' = H, R" = CH$_3$ (4.5) | 0 | 10 | 36 |
| 2 | Same as 1 (4.1) | Butane Diol (0.4) | 10 | 3.2 |
| 3 | R,R" = CH$_3$, R' = H, R''' = CH$_2$OPh (6.1) | 0 | 7.4 | 38 |
| 4 | Same as 3 (6.0) | Butane Diol (0.2) | 7.6 | 4.6 |
| 5 | Same as 1 (6.0) | *Polymeg 1000 (4.0) | 15 | 2.5 |
| 6 | Same as 1 (6.5) | 1,4-cyclohexane Dimethanol (0.7) | 15.5 | 2.4 |

*Polymeg 1000 is poly (tetramethylene ether) diol (eq. wt. of 492).

EXAMPLE 7

A mixture was prepared at room temperature of the bicyclic amide acetal of Example 1 (65 g), 49 g of polytetramethylene ether diol, equivalent weight of 492 and 220 g of liquified 4,4'-methylene bis(phenyl isocyanate) and was degassed on a rotary evaporator. An exotherm was observed in about two minutes for the mixture. The clear homogeneous mixture during the exotherm was poured into a glass mold formed from parallel glass plates spaced one-eighth inch apart and coated on their contact surfaces with a mold release agent (silicone type). The mold was heated in an oven at 100° C. for one hour, followed by heating at 130° C. for two more hours. The resulting clear, solid polymer sheet was found by testing to have an ASTM D648-56 (264 psi) heat distortion temperature (HDT) of 151° C., and ASTM D256 notched izod impact strength of 0.7 foot pounds/inch of notch, an unnotched izod impact strength of 11 foot pounds/inch, an ASTM D790 flexural strength of 17,499 psi, and a flexural modulus of 375,991 psi.

EXAMPLE 8

This Example is outside the scope of the present invention. The procedure of Example 7 was followed using a mixture of 65 g of the bicyclic amide acetal and 216 g of the diisocyanate and no polyol. The time to exotherm after mixing was about 30 minutes and the final clear polymer sheet was found to have an ASTM notched izod impact strength of 0.2 foot pounds/inch of notch and an unnotched izod impact strength of 4.5 foot pounds/inch.

EXAMPLE 9

The procedure of Example 7 was followed except that 165 g of the diisocyanate was used. The final polymer sheet was transparent and was found to have an ASTM heat distortion temperature of 129° C., a notched izod strength of 2.1 foot pounds/inch of notch and an unnotched izod impact strength of 16 foot pounds/inch.

EXAMPLE 10

A repeat of Example 7 using a poly (tetramethylene ether) diol having an equivalent weight of 995 and 159 g of the diisocyanate gave a final polymer sheet which was opaque and had an ASTM heat distortion temperature of 151° C., a notched izod impact strength of 0.7 foot pounds/inch of notch and an unnotched izod impact strength of 18 foot pounds/inch.

EXAMPLE 11

A repeat of Example 7 using as polyol 24.2 g of a poly (tetramethylene ether) diol having an equivalent weight of 483 and 121 g of the diisocyanate. The finished polymer sheet was translucent having an ASTM heat distortiontemperature of 120° C. and a notched izod impact strength of 1.4 foot pounds/inch of notch.

EXAMPLE 12

The procedure of Example 7 was repeated using 48 g of the bicyclic amide acetal, using as polyol 33.5 g of a poly (tetramethylene ether) diol having an equivalent weight of 334.6 and 129 g of the diisocyanate. The final polymer sheet was transparent and had an ASTM heat distortion temperature of 124° C. and a notched izod impact strength of 1.6 foot pounds/inch of notch.

EXAMPLE 13

The procedure of Example 7 was repeated using 48 g of the bicyclic amide acetal and using as polyol 48 g of poly (propylene ether) diol having an equivalent weight of 1033.3 and 121 g of the diisocyanate. The final polymer sheet was translucent, had an ASTM heat distortion temperature of 98° C. and a notched izod impact strength of 1.2 foot pounds/inch of notch.

EXAMPLE 14

The procedure of Example 7 was repeated using 48 g of the bicyclic amide acetal and as polyol 36 g of a triol (ethylene oxide tipped branched polypropylene glycol) having an equivalent weight of 1083.3 and 118 g of the diisocyanate. The final polymer sheet was translucent having a heat distortion temperature of 114° C., a notched izod impact strength of 1.25 foot pounds/inch of notch and an unnotched izod impact strength of 20 foot pounds/inch.

EXAMPLE 15

The procedure of Example 7 was repeated using as polyol 40 g of polypropylene glycol capped with ethylene oxide (diol) having an equivalent weight of 200 and 181 g of the diisocyanate. The final polymer sheet was transparent and was found to have a heat distortion temperature of 131° C., a notched izod impact strength of 1.0 foot pounds/inch of notch and an unnotched izod impact strength of 10 foot pounds/inch.

EXAMPLE 16

The procedure of Example 7 was repeated using as polyol 100 g of a polyethylene adipate diol having an equivalent weight of 500 and 181 g of the diisocyanate. The final polymer sheet was transparent and had a heat distortion temperature of 103° C., a notched izod impact strength of 1.3 foot pounds/inch of notch and an unnotched izod impact strength of 30 foot pounds/inch.

EXAMPLE 17

The prodecure of Example 7 was repeated using 26 g of the bicyclic amide acetal, 75 g of the polyol and 83 g of the diisocyanate. The final polymer sheet was transparent having a notched izod impact strength of 5.8 foot pounds/inch of notch and an unnotched izod impact strength of greater than 20 foot pounds/inch. The elastomeric product had an HDT of 78° C., elongation 300%, and compression set of 20%.

EXAMPLE 18

The procedure of Example 7 was repeated using 31 g of bicyclic amide acetal of Formula I wherein R and R″ are methyl, R′ is H and R‴ is —CH$_2$OPh, 20 g of the poly (tetramethylene ether) diol and 42 g of the diisocyanate. The final polymer sheet was transparent having a heat distortion temperature of 118° C., a notched izod impact strength of 1.2 foot pounds/inch of notch and an unnotched izod impact strength of 12 foot pounds/inch.

EXAMPLE 19

This is to demonstrate that eliminating the polyol in the Example 18 results in poor product. The experiment which is outside the scope of this invention was carried out exactly as in Example 18 except no poly tetramethylene ether was used and 35 g of isocyanate was used. The product was brittle with notched izod impact of 0.2 ft. lbs./inch and the HDT was 119° C.

EXAMPLE 20

The procedure of Example 7 was repeated using 48 g of methyl substituted bicyclic amide acetal, 32 g of dimerized linoleic acid which has reacted with one mole of ethylene oxide at each carboxyl group to form an ester diol (eq. wt. 320) and 130 g of diisocyanate. The final product (transparent) showed HDT of 129° C. and a notched izod impact pf 0.9 foot pounds/inch of notch.

EXAMPLE 21

A liquid carboxylic acid terminated acrylonitrile butadiene copolymer (45 g) was mixed with 65 g of the bicyclic amide acetal described in Example 1 and the resulting mixture was heated at 90° C. for 1 hour. The resulting solution was degassed in a rotary evaporator at room temperature and then was mixed with 4,4′-methylene-bis-(phenyl isocyanate). The mixture was then poured into a ↑ inch spaced glass mold and was cured at 100° C. for 1 hour followed by 2 hours at 140° C. The resulting opaque solid polymer was found to have an ASTM heat distortion temperature (HDT) of 158° C., a notched izod impact (NII) strength of 1.33 foot pounds/inch of notch and an unnotched izod impact (UNI) strength of greater than 20 foot pounds per inch.

EXAMPLES 22–28

Several elastomeric polyurethane products were prepared following the procedure of Example 21 using the bicyclic amide acetal of Example 1, liquified 4,4′-methylene-(phenylisocyanate), and as polyol either A. poly(tetramethylene ether) diol (equivalent weight of 492), or B. ethylene oxide capped dimerized linoleic acid described in Example 20 and the amounts used and results obtained for the final products are given in Table II. Example 22 is a control without the bicyclic amide acetal and thus is outside the scope of the present invention.

TABLE II

| Example | Polyol | Bicyclic Amide Acetal | Polyisocyanate | HDT | NII | UNI |
|---|---|---|---|---|---|---|
| 22 | A (98 g) | 0 | 31 g | too soft to test | | |
| 23 | A (115 g) | 33 g | 111 g | 48° C. | 4.8 | 15 |
| 24 | B (66.4 g) | 3.2 g | 50 g | 43° C. | 2.2 | 15 |
| 25 | B (55.6 g) | 4.2 g | 60 g | 63° C. | 2.0 | 15 |
| 26 | B (47.4 g) | 2.4 g | 71.7 g | 65° C. | 0.7 | 14 |
| 27 | B (48 g) | 10 g | 52 g | 50° C. | 2.0 | 15 |
| 28 | B (53) | 20 g | 72 g | 103° C. | 1.8 | 15 |

EXAMPLE 29

A polycarbonate diol having a hydroxyl number of 126 (44 g) was dissolved in 33 g of the bicyclic amide acetal of Example 1 and the resulting solution was degassed and mixed with 92 g of degassed, liquid 4,4′-methylene bis (phenyl isocyanate). The resulting solution was poured into a parallel glass plate mold and was heated for an hour at 100° C. and for an additional two hours at 140° C. The resulting transparent polymer was found to have a notched izod impact strength of 1.3 foot pounds per inch of notch and an unnotched izod impact strength of 15 foot pounds/inch.

WE CLAIM:

1. The process for preparing a polymer having high impact strength comprising interpolymerizing a mixture of a bicyclic amide acetal, a polyol and a polyisocyanate wherein the weight ratio of bicyclic amide acetal to polyol is in the range of from about 99:1 to 0.1:99.9 and the equivalent ratio of polyisocyanate to combined polyol and bicyclic amide acetal is in the range of from about 0.8:1 to about 3:1.

2. The process of Claim 1 wherein the bicyclic amideacetal is one having the formula

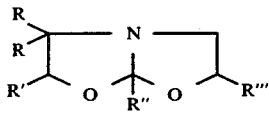

wherein R, R' and R''' independently represent hydrogen or an alkyl group having from 1 to 18 carbon atoms, R''' also represents an alkyl ether, an aryl or an alkaryl ether group having from 1–18 carbon atoms and R'' represents an alkyl group having from 1 to 18 carbon atoms, an aryl group having from 6 to 12 carbon atoms or an alkaryl group having from 7 to 20 carbon atoms.

3. The process of Claim 2 wherein the weight ratio of bicyclic amide acetal to polyol ranges from about 99:1 to 0.1:99.9 and the equivalent ratio of isocyanate to hydroxyl and one-half bicyclic amide acetal groups is in the range of from about 0.8:1 to about 3:1.

4. The process of Claim 3 wherein the bicyclic amide acetal is one in which R, R' and R''' are H and R'' is $CH_3$, the polyol is butane diol and the polyisocyanate is 4,4'-methylene bis (phenyl isocyanate).

5. The process of Claim 3 wherein the bicyclic amide acetal is one in which R and R'' are $CH_3$, R' is H and R''' is $CH_2OPh$, the polyol is butane diol and the polyisocyanate is 4,4'-methylene bis(phenyl isocyanate).

6. The process of Claim 3 wherein the bicyclic amide acetal is one in which R, R' and R''' are H and R'' is $CH_3$, the polyol is poly (tetramethylene ether) diol and the polyisocyanate is 4,4'-methylene bis (phenyl isocyanate).

7. The process of Claim 3 wherein the bicyclic amide acetal is one in which R,R' and R''' are H and R'' is $CH_3$, the polyol is 1,4-cyclohexane dimethanol and the polyisocyanate is 4,4'-methylene bis (phenyl isocyanate).

8. The process of Claim 3 wherein the bicyclic amide acetal is one in which R,R' and R''' are H and R'' is $CH_3$, the polyisocyanate is 4,4'-methylene bis(phenyl isocyanate) and the polyol is a triol which is an ethylene oxide tipped branched polypropylene glycol.

9. The process of Claim 3 wherein the bicyclic amide acetal is one in which R,R' and R''' are H and R'' is $CH_3$, the polyisocyanate is 4,4'-methylene bis (phenyl isocyanate) and the polyol is a polyethylene adipate diol.

10. The process of Claim 3 wherein the bicyclic amide acetal is one in which R and R'' are methyl, R' is H and R''' is $CH_2OPh$, the polyisocyanate is 4,4'-methylene bis (phenyl isocyanate) and the polyol is poly tetramethylene ether diol.

11. The process of Claim 3 wherein the bicyclic amide acetal is one in which R,R' and R''' are H and R'' is $CH_3$, the polyisocyanate is 4,4'-methylene bis(phenyl isocyanate) and the polyol is a diol prepared by end capping each of the carboxyl groups of dimerized linoleic acid with a mole of ethylene oxide.

12. The process of Claim 3 wherein the bicyclic amide acetal is one in which R,R' and R''' are H, and R'' is $CH_3$, the polyisocyanate is 4,4'-methylene bis(phenyl isocyanate) and the polyol is a liquid carboxyl terminated acrylonitrile butadiene copolymer which has reacted with the bicyclic amide acetal to form terminal hydroxyl groups.

13. The process of Claim 3 wherein the bicyclic amide acetal is one in which R, R' and R''' are H, and R'' is $CH_3$, the polyisocyanate is 4,4'-methylene bis (phenyl isocyanate) and the polyol is a hydroxyl terminated polycarbonate.

14. The polymer produced by the process of Claim 1.

* * * * *